(12) United States Patent
Ohmori et al.

(10) Patent No.: US 6,414,213 B2
(45) Date of Patent: *Jul. 2, 2002

(54) TITANIUM OXIDE PARTICLE-COATED INTERIOR MEMBER OR INDOOR EQUIPMENT

(75) Inventors: Masahiro Ohmori; Hidenori Nakamura, both of Chiba (JP)

(73) Assignee: Showa Denko K.K., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/475,150

(22) Filed: Dec. 30, 1999

Related U.S. Application Data

(60) Provisional application No. 60/115,149, filed on Jan. 7, 1999.

(30) Foreign Application Priority Data

Oct. 26, 1999 (JP) .......................................... 11-304603

(51) Int. Cl.$^7$ .......................... A62D 3/00; C01B 25/00; B01D 47/00; B01J 8/00; C07C 11/24
(52) U.S. Cl. ............. 588/227; 204/157.44; 204/157.63; 423/210; 423/239.1; 423/245.1; 423/245.3; 423/247
(58) Field of Search .............................. 423/210, 245.1, 423/245.3, 239.1; 204/247, 157.44, 157.63; 588/227

(56) References Cited

U.S. PATENT DOCUMENTS

| | | | | |
|---|---|---|---|---|
| 5,686,372 A | * | 11/1997 | Langford et al. ............ | 502/242 |
| 5,690,922 A | * | 11/1997 | Mouri et al. ................ | 424/76.1 |
| 5,821,186 A | * | 10/1998 | Collins ......................... | 502/8 |
| 5,874,701 A | * | 2/1999 | Watanabe et al. ....... | 204/157.15 |
| 5,981,426 A | * | 11/1999 | Langford et al. ............ | 502/309 |
| 6,027,766 A | * | 2/2000 | Greenberg et al. .......... | 427/226 |

FOREIGN PATENT DOCUMENTS

| | | | |
|---|---|---|---|
| EP | 826633 | * | 3/1998 |
| JP | 9-225319 | | 9/1997 |
| JP | 10015387 | * | 1/1998 |
| JP | 10-286537 | | 10/1998 |
| JP | 11100526 | * | 4/1999 |
| JP | 11-303030 | | 11/1999 |
| JP | 11-309379 | | 11/1999 |

* cited by examiner

Primary Examiner—Steven P. Griffin
Assistant Examiner—Jonas N. Strickland
(74) Attorney, Agent, or Firm—Sughrue Mion, PLLC

(57) ABSTRACT

An interior member or indoor equipment provided on the surface with titanium oxide particles capable of excellent photocatalytic activity even by irradiation of a weak ultraviolet ray present in an interior room or the like. An interior member or indoor equipment with titanium oxide particles containing brookite-type crystal present on the surface thereof. The titanium oxide particles may also be bonded to the surface using an adhesive. The interior member or indoor equipment exhibits a photocatalytic function upon irradiation of a weak ultraviolet ray having irradiation energy of from 0.001 to 0.2 mW/cm$^2$ at 365 nm.

9 Claims, No Drawings

TITANIUM OXIDE PARTICLE-COATED INTERIOR MEMBER OR INDOOR EQUIPMENT

CROSS REFERENCE TO RELATED APPLICATIONS

This application is an application filed under 35 U.S.C. §111(a) claiming benefit pursuant to 35 U.S.C. §119(e)(i) of the filing date of Provisional Application 60/115,149 filed Jan. 7, 1999 pursuant to 35 U.S.C. §111(b).

FIELD OF THE INVENTION

The present invention relates to an interior member or indoor equipment using a titanium oxide particle as a photocatalyst. More specifically, the present invention enables an organic material or nitrogen oxide adhering to the surface of an interior member or indoor equipment to be decomposed by the irradiation of a weak ultraviolet ray.

BACKGROUND OF THE INVENTION

Photocatalysis is a reaction of decomposing an organic material or nitrogen oxide present in air or water using light energy in the presence of a photocatalyst. Thus, photocatalysis is a technique which uses an ultraviolet ray present in the light emitted from sunlight or an interior room illuminator such as a fluorescent lamp and an incandescent lamp, and studies thereon are being made broadly, for example, on the application to architectural materials or the cleaning of water or air.

As the photocatalyst, zinc oxide, cadmium selenide, gallium arsenide and the like are known but titanium dioxide (hereinafter referred to as "titanium oxide") is usually used. Titanium oxide is known to assume three kinds of crystal structures, and in any structure, a distorted octahedron formed by the 6-coordination of oxygen atoms to titanium atom is fundamental. The three kinds of crystal structures are a tetragonal anatase type for low temperature, a rutile type for high temperature and a rhombic brookite type for a temperature between those two types. Among these, anatase titanium oxide is considered to be most excellent as a photocatalyst and a large number of studies have heretofore been made thereon.

It is known that the decomposing action of titanium oxide on contamination caused by adhesion of an organic material or on the generation of mold is generally accelerated by the action of an ultraviolet ray present in sunlight (see, Unexamined Re-Published International Patent Application WO96-29375). The mechanism in the decomposing action of titanium oxide is not yet fully understood, however, the decomposition presently is considered to proceed as follows.

When titanium oxide absorbs an ultraviolet ray, two kinds of electric charges (carriers) of an electron and a hole are generated inside and the hole is induced on the surface thereof. This hole acts with water on the particle surface to generate an OH radical having a strong oxidizing power on the surface of the particle and the pollutant positioned on the particle surface, such as nitrogen oxide, is decomposed by the OH radical into carbon dioxide gas, water or a low molecular weight material. These decomposition products accumulate on the particle surface and are washed out by rain or the like. As a result, the photocatalytic action of the particle is regenerated. Thus, the photocatalytic function of titanium oxide can be continuously maintained. (See, Akira Fukushima, Kazuhito Hashimoto and Toshiya Watanabe, *Titanium Oxide Photocatalysis Fundamentals and Applications*, BKC Inc., (1998)).

SUMMARY OF THE INVENTION

The present inventors have found that titanium oxide particles containing a brookite-type crystal exhibit a strong photocatalytic effect even under a weak ultraviolet ray. The present invention has been accomplished based on this finding.

An anatase titanium oxide as a photocatalyst has been mainly used. Irradiation energy of at least 0.005 $mW/cm^2$ at a wavelength of 365 nm is needed to exhibit the function of a photocatalyst. Therefore anatase titanium oxide as a photocatalyst has been only adopted on sunshiny areas such as the windows side of an indoor place or in an outdoor place. Brookite titanium oxide used in the present invention exhibits its photocatalytic function under the condition of a weak ultraviolet ray having an irradiation energy of, for example, 0.001 $mW/cm^2$ and under the conditions of light in indoor places.

The present inventors have thought that since the photocatalytic property of a titanium oxide particle is influenced by the OH radical concentration on the surface thereof or the like, selection of the crystal structure, surface shape or particle size of titanium oxide and control of the shape are matters of importance.

In other words, the generation of OH radicals is governed by the generation density of holes and the life thereof in the above-described mechanism and the generation density and life of a hole is governed by the band gap thereof. Therefore, the photo-functional property of titanium oxide is considered to be dependent on the crystal system. It is well known that a rutile-type crystal has a band gap of 3.0 eV and an anatase-type crystal has a band gap of 3.2 eV.

Furthermore, the OH radical is generated by the reaction of a hole with water, accordingly, the hole potential (corresponding to the potential of an electric charge depletion layer in the valence band) on the surface of titanium oxide plays an important factor. This potential is governed by the band system in the crystal structure, therefore, also in this point, the photo-functional property of titanium oxide is inferred to be dependent on the crystal system.

However, in the case of decomposing organic material or the like adsorbed, for example, on an interior member by letting titanium oxide be present on the surface of an interior member or indoor equipment in a room, a tunnel, a car, a plane or a ship, the ultraviolet ray which can be used is a weak ray emitted from an interior room illuminator and the like. Accordingly, unless a specific ultraviolet ray source such as a strong ultraviolet ray lamp is installed, sufficiently high percentage decomposition cannot be attained.

The present invention has been made under these circumstances and a primary object of the present invention is to obtain an interior member or indoor equipment capable of decomposing an organic material or nitrogen oxide adsorbed on wall paper, floor member or gauges, with the irradiation of a weak ultraviolet ray.

Another object of the present invention is to provide an interior member or indoor equipment where titanium oxide particles containing a brookite-type crystal are present on the surface thereon.

Still another object of the present invention is to provide a method of using titanium oxide particles containing a brookite-type crystal under the condition of irradiation with an ultraviolet ray having irradiation energy of from 0.001 to 0.2 $mW/cm^2$ at a wavelength of 365 nm.

DESCRIPTION OF THE PREFERRED EMBODIMENTS

The titanium oxide particles for use in the present invention contain brookite-type crystal. The titanium oxide particle is not particularly limited as long as brookite titanium oxide particle is present. The brookite titanium oxide particle may be used alone or a rutile or anatase titanium oxide particle may also be present. In the case of a rutile or anatase titanium oxide particle is present, the ratio of the brookite titanium oxide particle in the titanium oxide particles is not particularly limited but it is usually from 1 to 100 wt %, preferably from 10 to 100 wt %, more preferably from 50 to 100 wt %. This is because the brookite titanium oxide is superior in photocatalytic activity to rutile or anatase titanium oxide.

The titanium oxide particles containing a brookite-type crystal may be produced by a vapor-phase production process where anatase titanium oxide particles are heat-treated to obtain titanium oxide particles containing a brookite-type crystal, or by a liquid-phase production process where a solution of a titanium compound such as titanium tetrachloride, titanium trichloride, titanium alkoxide or titanium sulfate is neutralized or hydrolyzed to obtain a titanium oxide sol having dispersed therein titanium oxide particles.

The production process is not particularly limited as far as titanium oxide particles containing a brookite-type crystal can be obtained. However, taking account of the photocatalytic activity and manageability of the material obtained and in the case of forming a titanium oxide thin film, transparency and adhesion, a production process previously found by the present inventors (Japanese Patent Application Nos. 9-231172 and 10-132195) is preferred, where titanium tetrachloride is added to hot water at from 75 to 100° C. and then hydrolyzed at a temperature of from 75° C. to the boiling point of the solution while controlling the chloride ion concentration. Thereby titanium oxide particles containing brookite-type crystal are obtained as a titanium oxide sol.

The titanium oxide particles containing brookite-type crystal are not particularly limited in terms of the size thereof but usually have an average particle size of from 0.005 to 0.1 $\mu$m. If the average particle size exceeds 0.1 $\mu$m, the titanium oxide particles are reduced not only in photocatalytic activity but also in transparency. Therefore, when such titanium oxide particles are present on the surface of an interior member or the like, the color of the titanium oxide adversely affects the color of the interior member or the like. If the average particle size is less than 0.005 $\mu$m, the titanium oxide particle is difficult to handle during production thereof. The titanium oxide particle usually has a specific surface area of 20 $m^2$/g or more.

The thus-obtained titanium oxide particles containing a brookite-type crystal are allowed to be present on the surface of an interior member or indoor equipment by a method of coating a sol or solution of titanium oxide particles containing brookite-type crystal on an interior member substrate and thereafter drying or heat treating it to bond the particles to the surface of the interior member substrate or the like, or by a method of mixing titanium oxide particles containing brookite-type crystal with a coating material or the like and coating it on an interior member substrate, followed by drying or heat treatment. The titanium oxide particles containing brookite-type crystal may also be fixed on the interior member substrate or the like using, for example, an adhesive.

The method of coating a sol or solution of titanium oxide particles containing a brookite-type crystal on an interior member substrate is not particularly limited and any known method such as spin coating, flow coating, dip coating, spray coating, bar coating, roller coating or brush coating may be used. In the case of coating a titanium oxide sol, the amount coated is usually from 0.01 to 0.2 mm in terms of the thickness of the film coated.

In the case where a sol or solution of titanium oxide particles containing brookite-type crystal is coated on an interior substrate and thereafter dried or heat treated to bond the particles to the surface of the interior member substrate or the like, an adhesive may be added to the titanium oxide sol or solution. The adhesive is used to increase the adhesion strength between the titanium oxide particle and the interior member substrate. Although the adhesive is not particularly limited so far as it has a photocatalysis resistance, an oxide such as silicon oxide, aluminum oxide, zirconium oxide, calcium oxide and magnesium oxide, or an alkoxide as a precursor of these oxides is usually used.

These adhesives may be used individually or as a combination of two or more thereof. In the case of using a combination of adhesives, the mixing ratio may be freely selected. The amount of the adhesive added is, when the adhesive is calculated as an oxide, usually from 10 to 80 parts by weight per 100 parts by weight of titanium oxide particles. If the amount used exceeds 80 parts by weight, the ratio of titanium oxide particles buried in the adhesive increases and the photocatalytic activity decreases, whereas if it is less than 10 parts by weight, the effect ascribable to the adhesive addition may not be obtained.

The method for adding the adhesive is not particularly limited but a method of adding an adhesive to a titanium oxide sol or solution and then coating it on an interior substrate or a method of coating a titanium oxide sol or solution by spraying and at the same time, coating an adhesive by another spraying may be used.

In the case where a sol or solution of titanium oxide particles containing brookite-type crystal is coated on an interior material substrate and then dried, an appropriate solvent may be added so as to increase the drying rate. When the titanium oxide sol is dispersed in water, an organic solvent such as ethyl alcohol is usually used.

Before coating a sol or solution of titanium oxide particles containing brookite-type crystal on an interior material substrate, a solution containing a silica or fluorine resin may be coated on the interior member substrate and then dried to form a protective film on the interior member or the like.

After the sol or solution of titanium oxide particles containing brookite-type crystal is coated as above, the sol or solution is dried or heat-treated so as to fix the titanium oxide particles on the interior member substrate. The atmosphere for the drying or heat treatment is not particularly limited. The drying or heat treatment may be performed in atmospheric air, under vacuum or in an inert gas but it is usually performed in atmospheric air. The drying or heat treatment temperature is usually from 20 to 800° C., preferably from 20 to 150° C., and the drying or heat treatment time is usually from 5 minutes to 24 hours, preferably from 15 minutes to 12 hours.

In the case of using an interior member substrate with heat resistance, such as metal, ceramics or glass, the titanium oxide particle may be calcined after the drying or heat treatment. The calcining is performed to more firmly bond the titanium oxide particle to the interior member substrate or the like and in the case of a titanium oxide particle thin film, the calcining is performed to improve the hardness. The atmosphere for the calcining is not particularly limited and the calcining may be performed in atmospheric air, under vacuum or in an inert gas but is usually performed in atmospheric air. The calcining temperature varies depending on the kind of interior member substrate or the like, however, it is usually from 200 to 800° C. If the calcining temperature is less than 200° C., the effect of improving the adhesion of titanium oxide particles or the hardness of titanium oxide thin film may not be attained by the calcining, whereas if it exceeds 800° C., the brookite-type crystal transfers to the rutile-type crystal and the photocatalytic performance is disadvantageously reduced. The burning time is not particularly limited but is usually from 1 to 60 minutes.

In the thus-obtained interior member or indoor equipment where titanium oxide particles containing brookite-type crystal are present on the surface thereof, when the titanium oxide particles are present as a thin film, the thickness of the film is usually from 0.05 to 2 μm. If the film thickness is less than 0.05 μm, a sufficiently high photocatalytic performance may not be attained, whereas if it exceeds 2 μm, the photocatalysis takes place only in the vicinity of the surface of the titanium oxide thin film, as a result, titanium oxide not participating in the photocatalysis increases disadvantageously in view of profitability and the thin film is readily stripped off from the interior member substrate or the like.

The titanium oxide particles present on the interior member substrate may not be a thin film but may be, for example, in the form of islands.

The interior member or indoor equipment with titanium oxide particles containing a brookite-type crystal present on the surface thereof of the present invention can decompose an organic material or nitrogen oxide in air, adsorbed to the interior member or the like by photocatalysis of the titanium oxide particle. The interior member is not particularly limited as long as it is used indoors or in a car, a plane, a ship or a tunnel. Examples of interior members for indoor use such as use in a room, a bath or a kitchen, include wall paper, floors, wall tiles, window glass, curtains, blinds, luminaires, air-cooling and heating appliances such as air conditioners and stoves, OA instruments such as personal computers, AV instruments such as television and stereo, telephones, clocks, beds, lockers, cages, tableware, ashtrays, sinks, cooking ranges, fans and hoods thereof, dining tables or chairs, desks, household Buddhist shrines, family altars, cisterns such as goldfish basin, dressers, bathtubs, wash stands and stools. Examples of the interior member for use in laboratories and the like include draft chambers and glove boxes. Examples of interior member for use in a car, a plane or a ship include interior members such as seats, windshield glass, steering wheels, cover glasses of gauges, and radiation fins of a regenerator. Examples of interior member for use in a tunnel include inner walls, cover glass of illuminators, indicators, guide signs and a signboards.

The interior member or indoor equipment of the present invention is characterized by the use of titanium oxide particles containing brookite-type crystal, so that this interior member or the like reveals excellent photocatalysis even under irradiation with weak ultraviolet ray having an irradiation energy of from 0.01 to 0.2 mW/cm$^2$ at a wavelength of 365 nm as compared with interior members with titanium oxide particles of anatase or rutile-type crystal present on the surface thereof.

The interior member or indoor equipment thus having titanium oxide particles containing brookite-type crystal present on the surface thereof of the present invention enables photocatalysis to proceed efficiently even with a weak ultraviolet ray present in the interior room illuminator generally present in the living space, exhibits an excellent percentage decomposition for organic materials or nitrogen oxide adsorbed on an interior member or the like, and is suitable for use in a room, a car, a plane, a ship or a tunnel.

EXAMPLES

The present invention is described in greater detail below by referring to the Examples. Unless otherwise indicated, all parts, percents, ratios and the like are by weight.

Example A:

954 ml of distilled water was charged into a glass reaction tank having a volume of 1 l equipped with a reflux condenser and heated to 95° C. Then, the reaction tank was stirred at about 200 rpm and while keeping the liquid temperature in the tank at 95° C., 46 ml of an aqueous titanium tetrachloride solution was added dropwise to the reaction tank at a rate of about 2 ml/min. Thus, a solution having a titanium tetrachloride concentration of 0.25 mol/l (2 wt % in terms of titanium oxide) was obtained. After the completion of dropwise addition, the solution was heated to the vicinity of the boiling point (104° C.) and kept at this temperature for 60 minutes to hydrolyze the titanium tetrachloride. The sol obtained was cooled and the chlorine produced by the hydrolysis was removed by electrodialysis using an electrodialyzer Model G3 manufactured by Asahi Chemical Industry Co., Ltd. As a result, a water dispersion titanium oxide sol having a pH of 4.0 (chlorine ion: about 400 ppm) was obtained. On observation of particles in the sol through a transmission type electron microscope, the particle size of the particles was found to be from 0.01 to 0.03 μm.

In order to examine the crystal structure of the titanium oxide particles present in the sol, the sol was dried in a vacuum dyer at 60° C. and the titanium oxide particles present were analyzed by X-ray diffraction. The X-ray diffraction was performed using an X-ray diffractometer manufactured by Rigaku Denki KK (RAD-B rotor flex) with a Cu bulb. As a result, a peak indicating the diffraction of a (121) face of brookite-type crystal was detected at 2θ=30.8°. A peak indicating the diffraction of a (110) face, which is the main peak of rutile-type crystal, was not detected. Furthermore, the main peak of anatase-type crystal which overlaps the main peak of brookite-type crystal, could not be distinguished but peaks other than the main peak, indicating the diffraction of an anatase-type crystal were not detected either.

For coating the water dispersion titanium oxide sol containing brookite titanium oxide obtained above on a substrate, tetramethoxysilane as an adhesive, which is a silicon-type adhesive, and ethyl alcohol for improving the drying rate were added to prepare a coating material having the composition shown in Table 1 below.

TABLE 1

| Example and Comparative Example | Titanium Oxide (TiO$_2$) (mol/l) | | | Tetramethoxysilane, in terms of SiO$_2$ (wt %) | Ethyl Alcohol (wt %) |
|---|---|---|---|---|---|
| | Brookite | Anatase | Rutile | | |
| Example A | 2.5 | — | — | 4.0 | 75.0 |
| Comparative Example A | — | 5.0 | — | 10.0 | 75.0 |
| Comparative Example B | — | — | 2.5 | 4.0 | 75.0 |

Comparative Example A

For coating a water dispersion titanium oxide sol (specific surface area: about 270 m$^2$/g) comprising an anatase-type crystal and not containing brookite-type crystal on an interior member substrate, tetramethoxysilane as an adhesive, which is a silicon-type adhesive, and ethyl alcohol for improving the drying rate were added to prepare a coating material having the composition shown in Table 1 above.

Comparative Example B

For coating a water dispersion titanium oxide sol (specific surface area: about 10 m$^2$/g) comprising a rutile-type crystal and not containing a brookite-type crystal on an interior member substrate, tetramethoxysilane as an adhesive, which is a silicon-type adhesive, and ethyl alcohol for improving the drying rate were added to prepare a coating material having the composition shown in Table 1 above.

Example 1

2 ml of the coating material obtained in Example A was coated on a slide glass in a size of 76×26 mm by using flow coating method and after holding the glass vertically for 10 minutes, the extra coating material was removed. Then, the glass was kept at room temperature for 24 hours and the resulting glass having brookite titanium oxide particles present on the surface thereof was used as a sample for evaluation. On this glass, a few drops of ink (red) for an ink jet printer were coated and an ultraviolet ray was irradiated thereon from a UV light. After the irradiation, the decomposition degree of the ink was visually examined and evaluated as the organic material decomposing activity according to a three-stage rating. The irradiation was performed under three kinds of conditions. With respect to the irradiation energy of the ultraviolet ray, energy at a wavelength of 365 nm was measured using a sensor. The results obtained are shown in Table 2 below.

Example 2

The organic material decomposing activity was evaluated in the same manner as in Example 1 except that a tile in a size of 76×26 mm was used in place of the glass. The results obtained are shown in Table 2 below.

Example 3

The organic material decomposing activity was evaluated in the same manner as in Example 1 except that stainless in a size of 76×26 mm steel was used in place of the glass. The results obtained are shown in Table 2 below.

Example 4

The organic material decomposing activity was evaluated in the same manner as in Example 1 except that a plastic in a size of 76×26 mm was used in place of the glass. The results obtained are shown in Table 2.

Comparative Example 1

The organic material decomposing activity was evaluated in the same manner as in Example 1 except that a glass having anatase titanium oxide particles present on the surface thereof was obtained using the coating material obtained in Comparative Example A in place of the coating material obtained in Example A and used as a sample for evaluation. The results obtained are shown in Table 2 below.

Comparative Example 2

The organic material decomposing activity was evaluated in the same manner as in Example 1 except that a glass having rutile titanium oxide particles present on the surface thereof was obtained using the coating material obtained in Comparative Example B in place of the coating material obtained in Example A and used as a sample for evaluation. The results obtained are shown in Table 2 below.

In Table 2, the symbols indicate the following results.
A: satisfactory fading;
B: partly no fading;
C: no fading.
In Table 2, conditions (1) to (5) were as follows:
Condition (1):
An ultraviolet ray having irradiation energy of 2.0 mW/cm$^2$ at 365 nm was irradiated for 10 minutes.
Condition (2):
An ultraviolet ray having an irradiation energy of 1.0 mW/cm$^2$ at 365 nm was irradiated for 30 minutes.
Condition (3):
An ultraviolet ray having irradiation energy of 0.1 mW/cm$^2$ at 365 nm was irradiated for 120 minutes.
Condition (4):
An ultraviolet ray having irradiation energy of 0.003 mW/cm$^2$ at 365 nm was irradiated for 360 minutes.
Condition (5):
An ultraviolet ray having irradiation energy of 0.001 mW/cm$^2$ at 365 nm was irradiated for 2 days.

TABLE 2

| Example and Comparative Example | Interior Member Substrate | Organic Material Decomposing Activity Conditions | | | | |
|---|---|---|---|---|---|---|
| | | (1) | (2) | (3) | (4) | (5) |
| Example 1 | glass | A | A | A | A | B |
| Example 2 | tile | A | A | A | A | B |
| Example 3 | stainless steel | A | A | A | A | B |
| Example 4 | plastic | A | A | A | A | B |
| Comparative Example 1 | glass | A | A | C | C | C |
| Comparative Example 2 | glass | C | C | C | C | C |

Example 5

2 ml of the coating material obtained in Example A was coated on a slide glass in a size of 76×26 mm using a flow coating method and after holding the glass vertically for 10 minutes, the extra coating material was removed. Then, the glass was kept at room temperature for 24 hours and the resulting glass having brookite titanium oxide particles present on the surface thereof was used as a sample for evaluation. This sample for evaluation was placed in a chamber having a volume of 1,200 cm$^3$ and nitrogen oxide gas was charged thereinto in a concentration of 50 ppm.

Thereafter, an ultraviolet ray was irradiated from a UV light on the sample in the chamber. After the irradiation, the decomposition degree of the nitrogen oxide gas was determined by measuring the amount of the residual nitrogen oxide gas and evaluated as the organic material decomposing activity according to a three-stage rating. The irradiation was performed under three kinds of conditions. With respect to the irradiation energy of the ultraviolet ray, energy at a wavelength of 365 nm was measured using a sensor. The results obtained are shown in Table 3 below.

Example 6

The nitrogen oxide decomposing activity was evaluated in the same manner as in Example 5 except that aluminum in a size of 76×26 mm was used in place of the slide glass. The results obtained are shown in Table 3 below.

Example 7

The nitrogen oxide decomposing activity was evaluated in the same manner as in Example 5 except that a ceramic in a size of 76×26 mm was used in place of the slide glass. The results obtained are shown in Table 3 below.

Example 8

The nitrogen oxide decomposing activity was evaluated in the same manner as in Example 5 except that plastic in a size of 76×26 mm was used in place of the slide glass. The results obtained are shown in Table 3.

Comparative Example 3

The nitrogen oxide decomposing activity was evaluated in the same manner as in Example 5 except that aluminum having anatase titanium oxide particles present on the surface thereof was obtained using the coating material obtained in Comparative Example A in place of the coating material obtained in Example A and using aluminum in a size of 76×26 mm in place of the slide glass, and used as a sample for evaluation. The results obtained are shown in Table 3 below.

Comparative Example 4

The nitrogen oxide decomposing activity was evaluated in the same manner as in Example 5 except that a glass having rutile titanium oxide particles present on the surface thereof was obtained using the coating material obtained in Comparative Example B in place of the coating material obtained in Example A and used as a sample. The results obtained are shown in Table 3 below.

In Table 3, the symbols indicate the following results.

A: percentage decomposition of 80% or more;
B: percentage decomposition of from 50% to less than 80%;
C: percentage decomposition of less than 50%.

In Table 3, the conditions (1) to (5) were as follows:

Condition (1):
An ultraviolet ray having irradiation energy of 2.0 mW/cm$^2$ at 365 nm was irradiated for 10 minutes.

Condition (2):
An ultraviolet ray having irradiation energy of 1.0 mW/cm$^2$ at 365 nm was irradiated for 30 minutes.

Condition (3):
An ultraviolet ray having irradiation energy of 0.1 mW/cm$^2$ at 365 nm was irradiated for 120 minutes.

Condition (4):
An ultraviolet ray having irradiation energy of 0.003 mW/cm$^2$ at 365 nm was irradiated for 360 minutes.

Condition (5):
An ultraviolet ray having irradiation energy of 0.001 mW/cm$^2$ at 365 nm was irradiated for 2 days.

TABLE 3

| Example and Comparative Example | Interior Member Substrate | Nitrogen Oxide Decomposing Activity Conditions | | | | |
|---|---|---|---|---|---|---|
| | | (1) | (2) | (3) | (4) | (5) |
| Example 5 | glass | A | A | B | B | B |
| Example 6 | aluminum | A | A | B | B | B |
| Example 7 | ceramic | A | A | B | B | B |
| Example 8 | plastic | A | A | B | B | B |
| Comparative Example 3 | aluminum | A | B | C | C | C |
| Comparative Example 4 | glass | C | C | C | C | C |

As is apparent from the results in Tables 2 and 3, interior members having titanium oxide particles containing brookite-type crystal of the present invention present on the surface thereof exhibited excellent decomposing activity for the organic material and nitrogen oxide even under irradiation with weak ultraviolet ray having an irradiation energy of only 0.001 mW/cm$^2$ at 365 nm.

While the invention has been described in detail and with reference to specific embodiments thereof, it will be apparent to one skilled in the art that various changes and modifications can be made therein without departing from the spirit and scope thereof.

What is claimed is:

1. An interior member or indoor equipment with titanium oxide particles containing brookite crystal present on the surface thereof, wherein the titanium oxide particles have (i) an average particle size of from 0.005 to 0.1 μm and (ii) a photocatalytic function upon irradiation of an ultraviolet ray having an irradiation energy of from 0.001 to 0.2 mW/cm$^2$ at a wavelength of 365 nm, and the brookite crystal is present in an amount of from 10 to 100 wt %, based on the total weight of the titanium dioxide particles.

2. The interior member or indoor equipment as claimed in claim 1, wherein the titanium oxide particles are obtained from a titanium oxide sol produced by:

i) adding titanium tetrachloride to hot water at a temperature of from 75° C. to 100° C. and then ii) hydrolyzing at a temperature of from 75° C. to the boiling point of the solution while controlling the chloride ion concentration.

3. The interior member or indoor equipment as claimed in claim 1, wherein the interior member or indoor equipment is capable of decomposing an organic material or nitrogen oxide upon irradiation of an ultraviolet ray having an irradiation energy of from 0.001 to 0.2 mW/cm$^2$ at a wavelength of 365 nm.

4. A method of using the interior member or indoor equipment of claim 1, the method comprising irradiating the titanium oxide particles under the conditions of an ultraviolet ray having an irradiation energy of from 0.001 to 0.2 mW/cm$^2$ at a wavelength of 365 nm.

5. An interior member or indoor equipment with titanium oxide particles containing brookite crystal adhered on the surface thereof using an adhesive, wherein the titanium oxide particles have (i) an average particle size of from 0.005 to 0.1 μm and (ii) a photocatalytic function upon irradiation of an ultraviolet ray having an irradiation energy of from 0.0001 to 0.2 mW/cm$^2$ at a wavelength of 365 nm, and the brookite crystal is present in an amount of from 10 to 100 wt %, based on the total weight of the titanium dioxide particles.

6. The interior member or indoor equipment as claimed in claim 5, wherein the titanium oxide particles are obtained from a titanium oxide sol produced by:

i) adding titanium tetrachloride to hot water at a temperature of from 75° C. to 100° C. and then ii) hydrolyzing at a temperature of from 75° C. to the boiling point of the solution while controlling the chloride ion concentration.

7. The interior member or indoor equipment as claimed in claim 5, wherein the interior member or indoor equipment is capable of decomposing an organic material or nitrogen oxide upon irradiation of an ultraviolet ray having an irradiation energy of from 0.001 to 0.2 mW/cm$^2$ at a wavelength of 365 nm.

8. A method of using the interior member or indoor equipment of claim 5, the method comprising irradiating the titanium oxide particles under the conditions of an ultraviolet ray having an irradiation energy of from 0.001 to 0.2 mW/cm$^2$ at a wavelength of 365 nm.

9. A method of using titanium oxide particles containing brookite crystal, the method consisting of irradiating the particles under the conditions of an ultraviolet ray having an irradiation energy of from 0.001 to 0.2 mW/cm$^2$ at a wavelength of 365 nm, wherein the titanium oxide particles have (i) an average particle size of from 0.005 to 0.1 μm and (ii) a photocatalytic function upon irradiation of the ultraviolet ray, and the brookite crystal is present in an amount of from 10 to 100 wt %, based on the total weight of the titanium dioxide particles.

* * * * *